United States Patent
Kimber et al.

(10) Patent No.: US 7,292,582 B2
(45) Date of Patent: Nov. 6, 2007

(54) METHOD AND APPARATUS FOR ASSOCIATING A MEDIA TERMINAL ADAPTER WITH A CABLE MODEM IN AN HFC NETWORK

(75) Inventors: Gary Kimber, Jenkintown, PA (US); Prema Venkatesulu, Feasterville, PA (US)

(73) Assignee: General Instrument Corporation, Horsham, PA (US)

( * ) Notice: Subject to any disclaimer, the term of this patent is extended or adjusted under 35 U.S.C. 154(b) by 1114 days.

(21) Appl. No.: 10/291,170

(22) Filed: Nov. 8, 2002

(65) Prior Publication Data

US 2004/0090968 A1 May 13, 2004

(51) Int. Cl.
H04L 12/56 (2006.01)
G06F 12/00 (2006.01)

(52) U.S. Cl. .............. 370/395.54; 370/463; 709/245; 711/209

(58) Field of Classification Search ........... 370/395.54, 370/352, 356
See application file for complete search history.

(56) References Cited

U.S. PATENT DOCUMENTS

| | | | |
|---|---|---|---|
| 6,240,464 B1 * | 5/2001 | Fijolek et al. | 709/250 |
| 6,760,762 B2 * | 7/2004 | Pezzutti | 709/223 |
| 6,765,931 B1 * | 7/2004 | Rabenko et al. | 370/493 |
| 6,839,355 B1 * | 1/2005 | Saby et al. | 370/401 |
| 6,931,018 B1 * | 8/2005 | Fisher | 370/401 |
| 7,027,398 B2 * | 4/2006 | Fang | 370/235 |
| 7,073,055 B1 * | 7/2006 | Freed et al. | 713/155 |
| 2001/0049825 A1 * | 12/2001 | Hirose et al. | 725/111 |
| 2003/0145075 A1 * | 7/2003 | Weaver et al. | 709/223 |
| 2004/0109469 A1 * | 6/2004 | Lazarski et al. | 370/463 |

* cited by examiner

Primary Examiner—Wing Chan
Assistant Examiner—Gregory Sefcheck
(74) Attorney, Agent, or Firm—Larry T. Cullen

(57) ABSTRACT

A method is provided for determining a network address for an Media Terminal Adapter (MTA) associated with a given Cable Modem (CM) in a cable data network. The CM is embedded in the MTA. The method begins by providing a network address for the CM and identifying a first Management Information Base (MIB) table for the CM and MTA that includes information pertaining to interfaces of the CM and the MTA. Next, a first entry is located in the first MIB table, which first entry denotes an MTA-type interface. Based on the first entry, a second entry is located in the first MIB table associated with the MTA. The second entry uniquely identifies an interface of the MTA. A second MIB table is identified for the CM and MTA that includes addressing information pertaining to network addresses of the CM and MTA. A third entry is located in the second MIB table that is equal in value to the second entry in the MIB table. Based on the third entry, a fourth entry is located in the second MIB table. The fourth entry is the network address of the MTA associated with the CM.

25 Claims, 1 Drawing Sheet

TABLE 1

| IFINDEX | IFDESCR | IFTYPE | IFPHYSADDR |
|---|---|---|---|
| 100 | MTA DEVICE | 6 (ETHERNET CSMACD) | 00 04 BD 38 7C F6 |
| 101 | MTA ENDPOINT 1 | 198 (VOICE OVER CABLE) | |
| 102 | MTA ENDPOINT 2 | 198 (VOICE OVER CABLE) | |
| 2 | CABLE MODEM | 127 (CATV MAC LAYER) | 00 04 BD 38 7C F4 |

TABLE 2

| IPADENTIFINDEX | IPADENTADDR |
|---|---|
| 100 | 168.84.151.30 |
| 2 | 168.84.167.30 |

METHOD AND APPARATUS FOR ASSOCIATING A MEDIA TERMINAL ADAPTER WITH A CABLE MODEM IN AN HFC NETWORK

FIELD OF THE INVENTION

The present invention relates generally to hybrid fiber coaxial networks, and more particularly to hybrid fiber coaxial networks that support real-time multimedia services.

BACKGROUND OF THE INVENTION

Hybrid Fiber Coaxial (HFC) networks are rapidly evolving to support a variety of telecommunications services in addition to traditional broadcast type video services. In particular, HFC networks are being utilized for data services, including high speed Internet access. Cable network operators are expected to be providing medium to high penetration rate telephony services in the near future.

In an HFC network, telecommunications services such as telephone services can be provided through the use of a unit located at the side of the home or in a centralized location in the residence (or business). This unit, which forms the interface between the HFC network and the telephony Customer Premises Equipment (CPE) can be referred to as a Media Terminal Adaptor (MTA). The MTA contains line cards that provide an interface between the HFC network and traditional telephones. This may be accomplished through the use of a Plain Old Telephone Service (POTS) card located in the MTA. The MTA can also be in communication with other CPE including PCs and set-top boxes. The MTA transmits and receives signals over the HFC network using a known protocol, for example the Data Over Cable Service Interface Specification (DOCSIS), which uses a Media Gateway Control Protocol (MGCP) as the signaling protocol for telephony applications. Another protocol that has been defined to deliver Internet Protocol services of the HFC network is the PacketCable specification, which employs DOCSIS as its underlying platform.

The utilization of such an MTA unit allows the simultaneous delivery of voice, data and video services to the same subscriber. A cable modem (CM) serves as the device interface between the MTA and the HFC network. Under DOCSIS, the MTA and CM may be identified by a single pair of IP and media access control (MAC) addresses for purposes of monitoring and maintenance. The PacketCable standard, on the hand, requires that the CM and MTA each have its own pair of IP and MAC addresses. In order to accomplish this, each MTA must be associated with one of the CMs in the network. Accordingly, given the identity of a CM in the network, it is necessary to provide a method for identifying its associated MTA by finding its IP and MAC addresses.

SUMMARY OF THE INVENTION

In accordance with the present invention, a method is provided for determining a network address for an MTA associated with a given CM in a cable data network. The CM is embedded in the MTA. The method begins by providing a network address for the CM and identifying a first management information base (MIB) table for the CM and MTA that includes information pertaining to interfaces of the CM and the MTA. Next, a first entry is located in the first MIB table, which first entry denotes an MTA-type interface. Based on the first entry, a second entry is located in the first MIB table associated with the MTA. The second entry uniquely identifies an interface of the MTA. A second MIB table is identified for the CM and MTA that includes addressing information pertaining to network addresses of the CM and MTA. A third entry is located in the second MIB table that is equal in value to the second entry in the MIB table. Based on the third entry, a fourth entry is located in the second MIB table. The fourth entry is the network address of the MTA associated with the CM.

In accordance with one aspect of the invention, the first entry in the first MIB table is located by first eliminating one or more entries in the first MIB table denoting interface types not associated with an MTA to locate at least one remaining entry. A fifth entry is then located in the first MIB table. The fifth entry denotes an origination source of an MTA. The first entry is located based on the fifth entry and the at least one remaining entry.

In accordance with another aspect of the invention, the network address of the CM is an IP address.

In accordance with yet another aspect of the invention, the network address of the MTA is an IP address.

In accordance with another aspect of the invention, the first MIB table is an ifTable.

In accordance with another aspect of the invention, the second MIB table is an IPAddrtable.

In accordance with another aspect of the invention, the first entry is an ifType entry.

In accordance with another aspect of the invention the second entry is an IfIndex entry.

In accordance with another aspect of the invention, the third entry is an IpAdEntIfIndex entry.

In accordance with another aspect of the invention, the fourth entry is an IpAdEntAddr entry.

DETAILED DESCRIPTION

Figures 1, 2, 3:
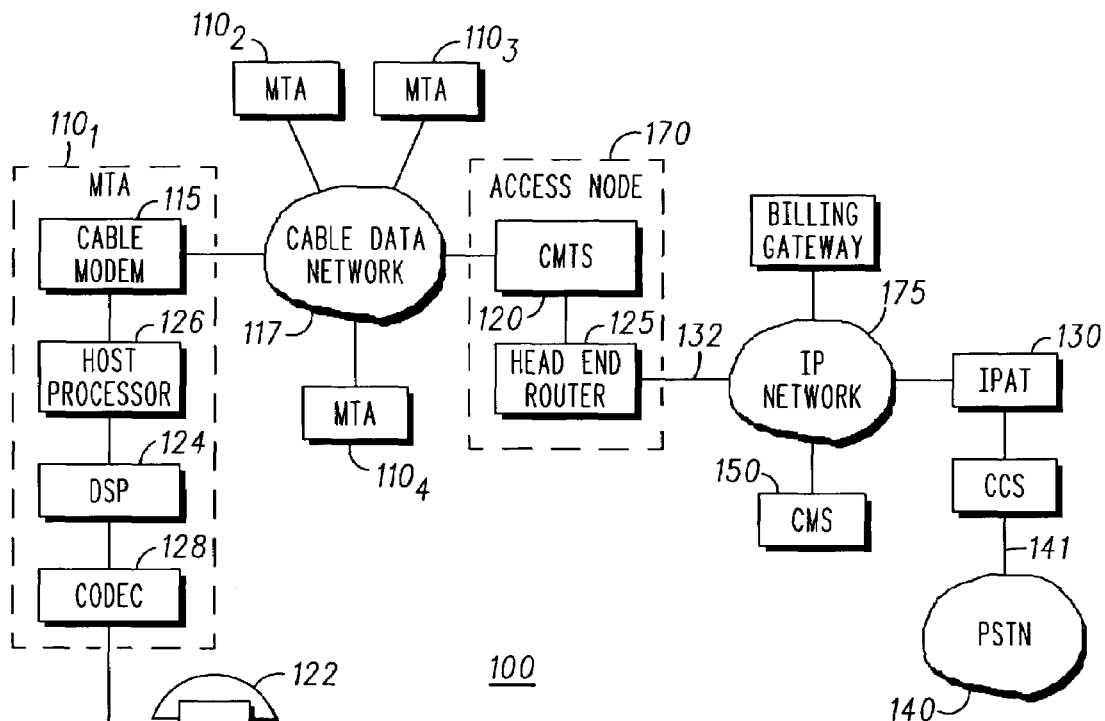
FIG. 1 shows an illustrative communications system embodying the principles of the present invention.
FIG. 2 shows a portion of an exemplary ifTable from MIB II that includes the ifIndex, ifDescr, ifType and ifPhysAddr MIB variables.
FIG. 3 shows a portion of an exemplary IPAddrtable corresponding to the IfTable depicted in FIG. 2.

An illustrative communications system embodying the principles of the invention is shown in FIG. 1. Viewed at a high level, communications system 100 contains three networks: a CATV network (e.g., a hybrid-fiber/coax network), a managed IP network, and the public switched telephone network (PSTN). The CATV network provides transport between the customer premises and a cable headend. The CATV network complies with the Data Over Cable Service Interface Specifications (DOCSIS) standard, which was developed by Cable Television Laboratories. The Packet-Cable specification, published by PacketCable™, defines a platform to deliver Internet Protocol services over a CATV network employing the DOCSIS standard. Among other things, the managed IP network provides long-haul connectivity between other managed IP and CATV networks.

Turning to FIG. 1 in more detail, communications system 100 is representative of a network architecture in which subscribers associated with Media Terminal Adapters (MTAs) $110_1$-$110_4$ may access the Internet 175 and the Public Switched Telephone Network (PSTN) 140. An MTA resides at the customer site and operates as an interface or gateway between customer premises equipment (e.g., a telephone, computer, facsimile machine, or any other device capable of sending or receiving data over a packet-switched network) and the CATV network. In particular, MTAs $110_1$-$110_4$ are in communication with the Internet 175 via a CATV network. Cable TV network access is provided by an MSO (Multi-Service Operator) (not shown). In this context, it is assumed the MSO provides (besides the traditional CATV access network facilities exemplified by communications network 117) Access Node 170 and cable modem 115. This CATV network arrangement is also referred to herein as a cable data network. CATV network is typically an all-coaxial or a hybrid-fiber/coax (HFC) cable network. MTAs $110_1$-$110_4$ are also in communication with PSTN 140 via the cable network, IP network 175, and IP Access terminal (IPAT) 130.

As shown in FIG. 1 for MTA $110_1$, the MTAs $110_1$-$110_4$ include customer premises equipment 122, e.g., terminal equipment such as a telephone or facsimile machine, a codec 128, a Digital Signal Processor (DSP) 124, host processor 126 and Cable Modem (CM) 115. An MTA, which, as in FIG. 1, includes the cable modem, is referred to as an embedded or E-MTA. On the other hand, an MTA that does not include the cable modem is referred to as a standalone or S-MTA. An S-MTA may be connected to an external cable modem via a USB or Ethernet protocol. Terminal equipment 122, codec 128, DSP 124, and host processor 126 are collectively representative of data terminal equipment, which is coupled to communications link 117 via CM 115. CM 115 provides the access interface to the cable data network via an RF connector and a tuner/amplifier (not shown). Broadly speaking, DSP 124 generates data packets from the analog signals received from the telephone 122. That is, DSP 124 and codec 128 collectively perform all of the voice band processing functions necessary for delivering voice and voice-band data over a cable network, including echo cancellation, packet loss concealment, call progress tone generation, DTMF/pulse and fax tone detection, audio compression and decompression algorithms such as G.723 and G.729, packet dejittering, and IP packetization/depacketization. Typically, DSP 124 encodes the data with pulse code modulated samples digitized at rates of 8, 16 or 64 kHz. Host processor 126 receives the data packet from the DSP 124 and adds an appropriate header, such as required by the MAC, IP, and UDP layers. Once the packet is complete, it is sent to CM 115, where it remains in a queue until it is transmitted over the cable data network to the CMTS 120 in the CATV headend 170. If the service being provided is a real-time service such as packet telephony, for example, the data packets should be formatted in accordance with a suitable protocol such as the Real-Time Transport Protocol (RTP).

An Internet Service Provider (ISP) provides Internet access. In the context of FIG. 1, it is assumed an ISP provides IP network 175, which includes a cable data network access router (not shown) attached to communications link 132. It should be noted that for illustrative purposes only it is assumed that the above-mentioned MSO and ISP Service provider are different entities even though this is not relevant to the inventive concept.

CM 115 is coupled to Access Node 170 via cable network 117, which is, e.g., a CATV radio-frequency (RF) coax drop cable and associated facilities. Access Node 170 provides services to a plurality of downstream users (only one of which is shown) and comprises cable modem data termination system (CMTS) 120 and head-end router 125. (CMTS 120 may be coupled to head-end router 125 via an Ethernet 100BaseX connection (not shown).) CMTS 120 terminates the CATV RF link with CM 115 and implements data link protocols in support of the service that is provided. Given the broadcast characteristics of the RF link, multiple customers and, hence, potentially many LANs may be serviced from the same CMTS interface. (Also, although not shown, it is assumed that the CATV network includes a plurality of Access Nodes.)

CM 115 and CMTS 120 operate as forwarding agents and also as end-systems (hosts). Their principal function is to transmit Internet Protocol (IP) packets transparently between the CATV headend and the customer location. The above noted standards have been prepared as a series of protocols to implement this functionality.

In a full voice-over-Internet communication system, a Call Management Server (CMS) 150 is the hardware or software component that provides the telephony intelligence in the communications system and is responsible for telephone call processing. In particular, CMS 150 is responsible for creating the connections and maintaining endpoint states required to allow subscribers to place and receive telephone calls, to use features such as call waiting, call forwarding and the like. In theory this invention can also apply to a switched IP communication system in which an IP digital terminal connected to a CLASS5 telephony switch substitutes for the CMS and IPAT. In this system, IP-based call signaling is conducted between MTA and IPDT and GR303 or V5.2 call signaling is conducted between IPDT and telephony switch. In this system IP voice traffic is conducted between MTA and IPDT.

In communications system 100 network management, maintenance, and monitoring is performed by an Element Management System (EMS). The EMS employs the Simple Network Management Protocol ("SNMP"), which is a standard Internet protocol, defined in several Requests for Comments ("RFCs"). There are two versions of SNMP—version 1 ("SNMPv1") and version 2 ("SNMPv2"). RFC 1157, entitled "A Simple Network Management Protocol," is one of the RFCs that define SNMPv1; RFCs 1441-1452 define SNMPv2.

The PacketCable specification requires a number of identifiers that are used by the Element Management System (EMS) to characterize an E-MTA. These specifications impose requirements on MTA device provisioning that make it more difficult to associate an MTA with a CM. In particular, an E-MTA is required to have two data-link or physical addresses (e.g., MAC addresses), one for the cable modem and one for the MTA. The E-MTA is also required to have two network addresses (e.g., IP addresses), one for the cable modem and one for the MTA. Currently however, the EMS manages an E-MTA as a single device. That is, the EMS assumes that an E-MTA has a single MAC/IP address. Under the PacketCable standard, the EMS will need to manage each E-MTA as two separate devices in a single chassis. In order to accomplish this, the EMS needs to know which CM maps to which MTA, as well as whether the CM is embedded in the MTA. In addition to this requirement, enhanced security and access control permits access of DOCSIS 1.1 MIB variables via the CM's address only. PacketCable MIB variables can only be accessed via the MTA's IP address. Also, a small subset of common MIB II variables is accessible via either address.

The present invention provides a number of techniques by which the EMS can relate a CM to its associated MTA. These techniques use standard Management Information Bases (MIBs), which can be thought of as virtual databases that include configuration, status and statistical information about a network element or device such as an MTA or a CM. The EMS obtains status information about the device or devices and configures setting and functions within the device or devices via the MIB. The EMS obtains the values of MIB variables from a device by communication via the SNMP protocol.

The various data elements making up a MIB may include status information about the system or device, any interfaces in the device, neighboring device IDs, etc. A large number of standard MIBs are currently defined for all types of network entities including switches, routers, bridges, multiplexors, and the like. The PacketCable standard defines MIBs for MTA device provisioning.

The first inventive technique assumes that the CM in an E-MTA has already been discovered so that its IP address is known. Accordingly, the technique does not depend on the particular CM discovery algorithm that is employed. Once the CM has been discovered, the following algorithm can be used to find its associated MTA. For each discovered CM, the EMS can use the ifTable from MIB 11. The ifTable contains the status and interface types of the various MTAs and CMs in the communication system. As seen in FIG. 2, the ifTable shows data in a table form. The ifIndex, ifDescr, ifType and ifPhysAddr are MIB variables that represent individual columns of the ifTable. It should be noted that while FIG. 2 shows a typical set of entries for the ifTable, only those entries pertinent to the present invention are shown. In general, the ifTable includes many more rows and columns than depicted in FIG. 2.

The MIB variables depicted in FIG. 2 are defined in RFC 1213 entitled "Management Information Base For Network Management of TCP/IP-Based Internets: MIB-II," which is hereby incorporated by reference in its entirety. As discussed therein, the ifIndex specifies a unique value for each interface of the CM and MTA. The ifDescr is a MIB variable that specifies the manufacturer, product name, version and the like of the devices. The ifType is a MIB variable denoting the type of interface while the ifPhysAddr denotes the physical layer address of the interface.

In the first inventive technique, since the EMS has identified the cable modem, it should in principle be possible to search the ifType column of the ifTable to identify the object having a value that corresponds to the MTA's rf interface. In the example of FIG. 2, the ifType variable has a value of 6, corresponding to an Ethernet Csmacd interface. Once the interface is identified, the value of its ifIndex can be read directly off the ifTable. In FIG. 2, the IfIndex of this interface has a value of 100. Given this information, the EMS next examines the IPAddrtable for the CM and MTA. The IPAddrtable contains addressing information relevant to the IP addresses of the device.

FIG. 3 shows a portion of the IPAddrtable corresponding to the IfTable depicted in FIG. 2. This portion of the IPAddrtable only shows two MIB variables, IpAdEntIfIndex and IpAdEntAddr. The IpAdEntIfIndex specifies a unique value identifying each interface of the MTA and CM. The IpAdEntIfIndex value and the IfIndex value for any given interface are the same. Accordingly, since the IfIndex value for the MTA interface is already known, its IpAdEntIfIndex is also known and can thus be located in the IPaddrTable. That is, in FIG. 3 the IpAdEntIfIndex has a value of 100. Given the IpAdEntIfIndex, the IpAdEntAddr, which specifies the IP address of the MTA interface, can be read directly off the IPAddrtable (168.84.151.30 in FIG. 3). Accordingly, in this first of the inventive techniques, the IP address of the MTA associated with the CM is determined by examining the entries of the ifTable and the IPAddrtable.

One factor complicating the aforementioned technique is that at the present time the PacketCable specifications do not specify an IfType value for the MTA's rf interface. Accordingly, at this time it is not possible to directly read the ifType value of the interface off the ifTable. As an interim measure, the ifType column of the ifTable can be examined to locate the ifType value for the telephony endpoints of the MTA, which is currently specified by PacketCable (as voice over cable with a value of 198). If one or more of these endpoints are found, this means that the device has an embedded MTA so that a process of elimination can be used, as discussed below.

The ifType value for the MTA's rf interface can then be found by a process of elimination. In particular, by eliminating the IfType values for the CM and the telephony endpoints and then searching the remaining rows that have not been eliminated for a IfDesc value that matches an MTA, the row for the MTA, and hence its IfType, can be found. Once the MTA's ifType is known, the method proceeds in the manner discussed above.

As previously mentioned, the first inventive technique presented above is only applicable to E-MTA's. The second inventive technique, however, can be used to relate a CM to its associated MTA regardless of whether the MTA is an E- or an S-MTA. In addition to the MIBs specified in RFC 1213, this technique also employs MIBs that are defined in accordance with the DOCSIS standard. In particular, this technique employs MIB variables specified in RFC 2699 entitled "DOCSIS Cable Device MIB Cable Device Management Information Base for DOCSIS Compliant Cable Modems and CableModem Termination Systems," which is hereby incorporated by reference in its entirety. MIB variables selected from the docsDevCpe group of MIBs are used by this second technique. The docsDevCpe group of MIBs provides control over which IP addresses can be used by Customer Premises Equipment (CPE) (such as an MTA) that is serviced by a given CM. In this technique the EMS finds the value of the docsDevSerial Number MIB variable, which provides the manufacture's serial number for the CM. The EMS also finds the sysObjectID MIB variable from RFC 1213, which is the vendor's identification for the CM. The EMS then uses the docsDevCpeTable, which is a table of IP addresses used to prevent misuse of IP addresses by subscribers. Within the docsDevCpeTable is the docsDevCpeIp MIB variable, which provides the IP address for each CPE that is provisioned. For each CPE entry in the table, the EMS will retrieve from the CPE the pktcDevSerialNumber MIB variable, which lists the vendor serial number for the MTA, and the MIB II and the sysObjectID MIB variable. Accordingly, if an MTA serial number is found in the pktcDevSerialNumber MIB, it follows that an MTA must be present and associated with the CM. If the serial number of the CM and the serial number of the MTA match, and if the vendor information for both the CM and the MTA match (as obtained from the sysObjectID MIB), then the MTA is an embedded MTA, otherwise it is a standalone-MTA.

Clearly, for this second inventive technique to work successfully, a number of assumptions have been made. Specifically, it assumes that the vendor is using the same serial number for the MTA and the CM in an embedded device, that the pktcDevSerialNumber and docsDevSerialNumber are filled in, and, finally, that the docsDevCpeTable is filled in.

The second inventive technique is preferable to the first inventive technique in those cases where one or more S-MTAs may be located at the customer premises. In cases where only E-MTAs need to be discovered, the first inventive technique if generally preferable because it makes fewer assumptions. The second technique can also be used as a fallback when the first technique fails, or as a means of verifying the results of the first technique. That is, because the second technique makes so many assumptions, the first technique should be attempted first. If it's successful, it may still be advantageous to look up the serial numbers of the CM and MTA in accordance with the second technique as a means of verification.

Similar to the first inventive technique, the third inventive technique is only applicable to an E-MTA. However, in contrast to the first inventive technique, this technique uses the MTA to find the CM. The technique assumes that the MTA is configured to send an SNMP inform to the EMS. The SNMP inform is a broadcast in which the MTA identifies itself to EMS, confirms that it has completed its registration process, and provides its IP and MAC addresses. Since the MTA has been discovered, its associated ifTable can be located The EMS can then search the entries of the ifTable for the ifType MIB variable to find the one that corresponds to a CM interface (ifType=CATV MacLayer (127)). Once the CM interface has been found, its IfIndex can also be located in the ifTable. Given its IfIndex, the EMS next examines the IPAddrtable for the CM and MTA. Once again, the IpAdEntIfIndex value in the IPAddrtable and the IfIndex value in the IfTable are the same for any given interface. Accordingly, since the IfIndex value for the CM interface is already known, its IpAdEntIfIndex is also known and can thus be located in the IPAddrtable. Given the IpAdEntIfIndex, the IpAdEntAddr, which specifies the IP address of the CM interface, can be read directly off the IPAddrtable by the EMS.

The invention claimed is:

1. A method for determining a network address for a media terminal adapter (MTA) associated with a given cable modem CM in a cable data network, said CM being embedded in said MTA, said method comprising the steps of:
    providing a network address for the CM; identifying a first management information base (MIB) table for the CM and MTA that includes information pertaining to interfaces of the CM and the MTA;
    locating a first entry in the first MIB table, said first entry denoting an MTA-type interface; based on the first entry, locating a second entry in the first MIB table associated with the MTA, said second entry uniquely identifying an interface of the MTA;
    identifying a second MIB table for the CM and MTA that includes addressing information pertaining to network addresses of the CM and MTA;
    locating a third entry in the second MIB table that is equal in value to the second entry in the first MIB table; and
    based on the third entry, locating a fourth entry in the second MIB table, said fourth entry being the network address of the MTA associated with the CM.

2. The method of claim 1 wherein the step of locating the first entry in the first MIB table includes the steps of:
    eliminating one or more entries in the first MIB table denoting interface types not associated with an MTA to locate at least one remaining entry;
    locating a fifth entry in the first MIB table, said fifth entry denoting an origination source of an MTA; and
    based on the fifth entry and the at least one remaining entry, locating the first entry.

3. The method of claim 1 wherein the network address of the CM is an IP address.

4. The method of claim 1 wherein the network address of the MTA is an IP address.

5. The method of claim 1 wherein the first MIB table is an ifTable.

6. The method of claim 5 wherein the second MIB table is an IPAddrtable.

7. The method of claim 6 wherein the first entry is an ifType entry.

8. The method of claim 6 wherein the second entry is an IfIndex entry.

9. The method of claim 6 wherein the third entry is an IpAdEntIfIndex entry.

10. The method of claim 6 wherein the fourth entry is an IpAdEntAddr entry.

11. A method for determining if an a media terminal adapter (MTA) is associated with a given cable modem CM in a cable data network, said method comprising the steps of:
    providing a network address for the CM;
    locating a first value for a first management information base (MIB) variable providing a serial number for the CM;
    locating a second value for a second MIB variable providing a vendor identification for the CM;
    locating a third value for a third MIB variable providing a network address for each provisional customer premises equipment (CPE);
    for each of the third values that are located, searching for a fourth value for a fourth MIB variable specifying a serial number for an MTA;
    identifying an MTA associated with the CM for each fourth value that is found; and
    for each identified MTA, comparing the fourth value to the first value such that if the first and the fourth values are the same said MTA is an embedded MTA and if the first and the fourth values are not the same said MTA is an standalone MTA.

12. The method of claim 11 wherein the network address for the CM is an IP address.

13. The method of claim 11 wherein the first MID variable is a docsDevSerialNumber MIB.

14. The method of claim 11 wherein the second MIB variable is a SysObjectID MIB.

15. The method of claim 11 wherein the third MIB variable is a docsDevCpelp MIB.

16. The method of claim 11 wherein the fourth MIB variable is a pktcDevSerialNumber MIB.

17. A method for determining a network address for a cable modem CM associated with a given a media terminal adapter (MTA) in a cable data network, said CM being embedded in said MTA, said method comprising the steps of:
    receiving an identifying broadcast from the MTA;
    identifying a first MIB table for the CM and MTA that includes information pertaining to interfaces of the CM and the MTA;
    locating a first entry in the first MIB table, said first entry denoting an CM-type interface;
    based on the first entry, locating a second entry in the first MIB table associated with the CM, said second entry uniquely identifying an interface of the CM;
    identifying a second MIB table for the CM and MTA that includes addressing information pertaining to network addresses of the CM and MTA;
    locating a third entry in the second MID table that is equal in value to the second entry in the first MIB table; and based on the third entry, locating a fourth entry in the second MIB table, said fourth entry being the network address of the CM associated with the MTA.

18. The method of claim 17 wherein the identifying broadcast of the MTA is an SNMP inform.

19. The method of claim 17 wherein the network address of the CM is an IP address.

20. The method of claim 17 wherein the first MIB table is an ifTable.

21. The method of claim 20 wherein the second MIB table is an IPAddrtable.

22. The method of claim 21 wherein the first entry is an ifType entry.

23. The method of claim 21 wherein the second entry is an IfIndex entry.

24. The method of claim 21 wherein the third entry is an IpAdEntIfIndex entry.

25. The method of claim 21 wherein the fourth entry is an IpAdEntAddr entry.

* * * * *